United States Patent
Khaja et al.

(10) Patent No.: US 12,091,011 B1
(45) Date of Patent: Sep. 17, 2024

(54) ROLLING VEHICLE LAUNCH CONTROL TECHNIQUES

(71) Applicant: FCA US LLC, Auburn Hills, MI (US)

(72) Inventors: Basil M Khaja, Waterford, MI (US); James J Daley, Jackson, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/496,132

(22) Filed: Oct. 27, 2023

(51) Int. Cl.
| | |
|---|---|
| *B60W 10/04* | (2006.01) |
| *B60W 10/10* | (2012.01) |
| *B60W 10/22* | (2006.01) |
| *B60W 30/18* | (2012.01) |

(52) U.S. Cl.
CPC ...... *B60W 30/18027* (2013.01); *B60W 10/04* (2013.01); *B60W 10/10* (2013.01); *B60W 10/22* (2013.01); *B60W 2510/104* (2013.01); *B60W 2520/10* (2013.01); *B60W 2540/10* (2013.01); *B60W 2540/16* (2013.01); *B60W 2710/06* (2013.01); *B60W 2710/10* (2013.01); *B60W 2710/22* (2013.01)

(58) Field of Classification Search
CPC .......... B60W 30/18027; B60W 10/04; B60W 10/06; B60W 10/10; B60W 10/11; B60W 10/22; B60W 30/18009; B60W 30/18172; B60W 2510/104; B60W 2520/10; B60W 2540/10; B60W 2540/16; B60W 2710/06; B60W 2710/10; B60W 2710/22
USPC ........................................ 477/34; 701/54, 65
See application file for complete search history.

(56) References Cited

U.S. PATENT DOCUMENTS

| | | | |
|---|---|---|---|
| 7,853,389 B2 | 12/2010 | Luehrsen et al. | |
| 8,140,238 B2 | 3/2012 | Luehrsen et al. | |
| 10,189,469 B2 | 1/2019 | Atluri et al. | |
| 11,091,033 B2 * | 8/2021 | Nonaka | B60W 30/18172 |
| 2010/0161188 A1 * | 6/2010 | Turski | B60T 8/175 701/67 |
| 2017/0190228 A1 * | 7/2017 | Handzel, Jr. | B60W 30/02 |

\* cited by examiner

*Primary Examiner* — Roger L Pang
(74) *Attorney, Agent, or Firm* — Jeremy J. Klobucar

(57) ABSTRACT

Rolling launch control techniques for a vehicle involve a set of devices configured to obtain rolling launch control information including at least a start speed for a rolling drag race including the vehicle and a controller configured to control a powertrain of the vehicle such that the vehicle maintains the start speed until the start of the rolling drag race, receive a first driver input in preparation for the rolling drag race, the first driver input including at least a fully-depressed accelerator pedal, optimally adjust settings of at least one of the powertrain and a driveline of the vehicle based on the rolling launch control information, and in response to a start signal or indication for the rolling drag race, stop maintaining the vehicle start speed and launch the vehicle with the fully-depressed accelerator pedal and the optimized powertrain/driveline settings.

20 Claims, 2 Drawing Sheets

ROLLING VEHICLE LAUNCH CONTROL TECHNIQUES

FIELD

The present application generally relates to vehicle launch control and, more particularly, to techniques for rolling vehicle launch control.

BACKGROUND

Conventional vehicle launch control is focused only on controlling vehicle launches from a stop or a standstill. This includes, for example, organized drag racing events. Another popular comparative performance metric is a rolling vehicle drag race, which involves each vehicle launching from the same rolling speed (e.g., 40 miles per hour). Conventional rolling vehicle drag races involve one vehicle providing a start indication (e.g., three honks of the signaling vehicle's horn), upon which each participating vehicle transitions to maximum acceleration or "wide-open throttle" (WOT). Many inexperienced drivers, however, may not be sure what settings to use in their vehicle (traction control, suspension settings, gear position, throttle position, etc.) during rolling drag races. This frequently leads to suboptimal acceleration rates during a rolling drag race (e.g., the vehicle may have to downshift immediately, which can waste time, or the selected gear may be too high, which will cause the vehicle acceleration rate to be slower than desired). Thus, while conventional vehicle launch control systems do work well for their intended purpose, an opportunity exists for improvement in the relevant art.

SUMMARY

According to one example aspect of the invention, a rolling launch control system for a vehicle is presented. In one exemplary implementation, the rolling launch control system comprises a set of devices configured to obtain rolling launch control information for a rolling drag race including the vehicle, the rolling launch control information including at least a start speed for the rolling drag race and a controller configured to control a powertrain of the vehicle such that the vehicle maintains the start speed until the start of the rolling drag race, receive a first driver input in preparation for the rolling drag race, the first driver input including at least a fully-depressed accelerator pedal, optimally adjust settings of at least one of the powertrain and a driveline of the vehicle based on the rolling launch control information, and in response to a start signal or indication for the rolling drag race, stop maintaining the vehicle start speed and launch the vehicle with the fully-depressed accelerator pedal and the optimized powertrain/driveline settings.

In some implementations, the start speed for the rolling drag race is provided by the driver as a driver input or is communicated to the vehicle by another vehicle participating in the rolling drag race. In some implementations, the rolling launch control information includes at least one of a plurality of operating parameters of the powertrain and a plurality of conditions of a road along which the vehicle is traveling. In some implementations, the driveline settings include at least one of traction control settings and suspension settings. In some implementations, the first driver input further includes the driver holding one of two steering wheel paddle shifters of the vehicle. In some implementations, the controller is configured to launch the vehicle in response to a second driver input that includes the driver releasing the one of the two steering wheel paddle shifters.

In some implementations, the controller is further configured to determine whether the vehicle is a starter/flagger vehicle for the rolling drag race. In some implementations, when the vehicle is the starter/flagger vehicle for the rolling drag race, the controller is further configured to automatically output the start signal or indication for the rolling drag race. In some implementations, the controller is configured to automatically output the start signal or indication for the rolling drag race in response to the driver providing a second driver input. In some implementations, the second driver input is holding the other of the two paddle shifters, and wherein the start signal or indication is three successive honks of a horn of the vehicle.

According to another example aspect of the invention, a rolling launch control method for a vehicle is presented. In one exemplary implementation, the rolling launch control method comprises receiving, by a controller and from a set of devices, rolling launch control information for a rolling drag race including the vehicle, the rolling launch control information including at least a start speed for the rolling drag race, controlling, by the controller, a powertrain of the vehicle such that the vehicle maintains the start speed until the start of the rolling drag race, receiving, by the controller, a first driver input in preparation for the rolling drag race, the first driver input including at least a fully-depressed accelerator pedal, optimally adjusting, by the controller, settings of at least one of the powertrain and a driveline of the vehicle based on the rolling launch control information, and in response to a start signal or indication for the rolling drag race, stopping maintaining the vehicle start speed and launching, by the controller, the vehicle with the fully-depressed accelerator pedal and the optimized powertrain/driveline settings.

In some implementations, the start speed for the rolling drag race is provided by the driver as a driver input or is communicated to the vehicle by another vehicle participating in the rolling drag race. In some implementations, the rolling launch control information includes at least one of a plurality of operating parameters of the powertrain and a plurality of conditions of a road along which the vehicle is traveling. In some implementations, the driveline settings include at least one of traction control settings and suspension settings. In some implementations, the first driver input further includes the driver holding one of two steering wheel paddle shifters of the vehicle. In some implementations, launching the vehicle is performed by the controller in response to a second driver input that includes the driver releasing the one of the two steering wheel paddle shifters.

In some implementations, the method further comprises determining, by the controller, whether the vehicle is a starter/flagger vehicle for the rolling drag race. In some implementations, when the vehicle is the starter/flagger vehicle for the rolling drag race, the method further comprises automatically outputting, by the controller, the start signal or indication for the rolling drag race. In some implementations, automatically outputting the start signal or indication for the rolling drag race is performed by the controller in response to the driver providing a second driver input. In some implementations, the second driver input is holding the other of the two paddle shifters, and wherein the start signal or indication is three successive honks of a horn of the vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
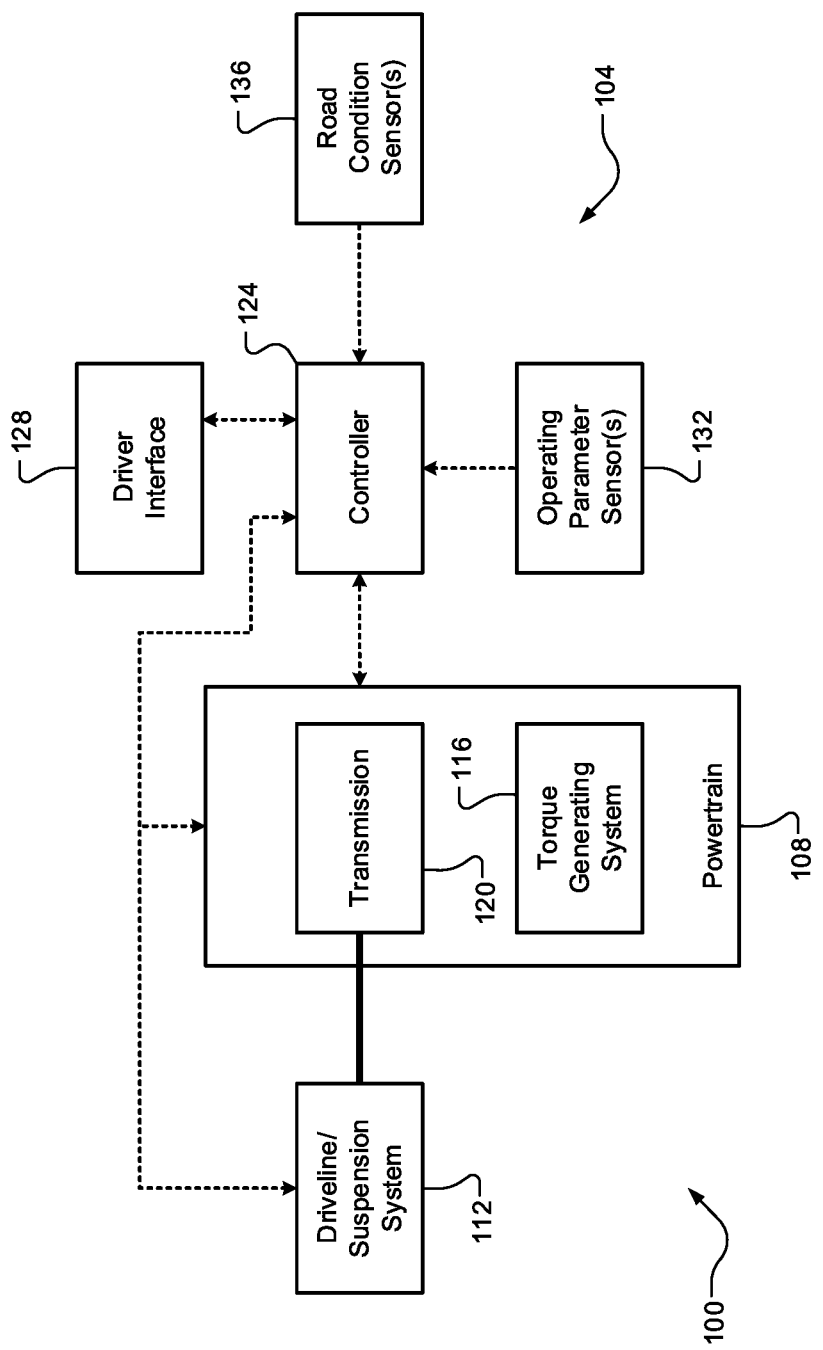
FIG. 1 is a functional block diagram of a vehicle having an example rolling launch control system according to the principles of the present application.

As previously discussed, in addition to conventional (standstill) drag racing, such as at organized/legal drag racing events, another popular comparative performance metric is a rolling vehicle drag race, which involves each vehicle launching from the same rolling speed (e.g., 40 miles per hour). This is because in rolling drag racing, traction control issues are less of an issue compared to conventional standstill drag racing. During rolling drag racing, the driver is required to select the correct gear and other vehicle settings (traction control, suspension, etc.) manually. The driver also has to hold the start speed manually by controlling the throttle and brake pedals, as well as sometimes providing a start indication (e.g., three honks of the vehicle's horn). Manual selection of vehicle parameters generally requires substantial driver experience with the vehicle and a better understanding of the racing parameters (road conditions, vehicle behavior at the rolling launch speed, etc.).

Sometimes, this type of experience can also be difficult to acquire, due to the nature of rolling drag racing and the limited scenarios where it can safely occur. Also, if the driver selects the initial gear manually, the transmission generally defaults to a "manual shifting" mode, and now the driver must continue to manually shift gears during the race, which can add unnecessary complexity and distraction. All of these racing requirements (holding proper vehicle speed while trying to find the correct gear and other settings, steering the vehicle while also possibly signaling the start of the race and observing the other vehicle(s) to make sure the driver(s) is/are ready, etc.) can become overwhelming to the inexperienced driver. Thus, an opportunity for improvement exists in the relevant art.

Accordingly, improved rolling vehicle launch control techniques for improved rolling drag racing performance are presented herein. The techniques obtain inputs from the driver as well as several vehicle parameters in order to achieve an optimal acceleration rate while the vehicle is in motion. The driver can input, for example, a desired start speed, and the vehicle will then shift into the appropriate gear and hold the desired speed until a driver input is given to accelerate at the highest rate possible (e.g., wide-open throttle, or WOT). Other powertrain preconditioning could also be performed, such as generating a torque reserve (engine spark retardation, air/exhaust flow management for a turbocharger/supercharger, air/exhaust gas cooling, battery or fuel cell management, etc.) which could then be depleted during the rolling drag race.

Additionally, based on road conditions there may be an optimal traction control/suspension/etc. setting that would work best, which along with the previously mentioned parameters can be selected automatically by the vehicle with the proposed rolling launch control (RLC) feature. This allows for the driver to focus on steering and the rolling drag race itself, rather than manually performing all of these actions. The potential benefits include improved rolling drag racing performance and an improved driver experience. It will be appreciated that the usage of these techniques could be limited to specific scenarios such as organized/legal drag racing events or at similar locations (a drag strip, a track, or the like).

Referring now to FIG. 1, a functional block diagram of a vehicle 100 having an example rolling launch control (RLC) system 104 according to some implementations of the present application is illustrated. The vehicle 100 includes a powertrain 108 configured to generate and transfer drive torque to a driveline/suspension system 112 (hereinafter, "driveline" or "driveline system") for vehicle propulsion. The powertrain 108 includes a torque generating system 116 configured to generate drive torque and a transmission 120 (e.g., a multi-speed automatic transmission) configured to transfer the drive torque from the torque generating system 116 to the driveline 112. The powertrain 108 and, more particularly, the torque generating system 116 could have any suitable configuration (e.g., an internal combustion engine, one or more electric motors, or some combination thereof). A controller 124 is configured to control operation of the vehicle 100 including controlling the powertrain 108 to generate and transfer a desired amount of drive torque to the driveline 112 to satisfy a torque request. The torque request could be provided, for example, by a driver of the vehicle 100 via a driver interface 128.

Non-limiting examples of the driver interface 128 include an accelerator pedal, a brake pedal, a transmission gear selector, a steering wheel, steering wheel paddle shifters (e.g., left and right paddle shifters), a horn actuator, and a touch display. The controller 124 is also configured to perform at least a portion of the techniques of the present application, which will be described more fully below. The controller 124 is configured to receive a plurality of inputs, such as measured operating parameters (vehicle speed, shaft speeds, temperatures, current gear, current driveline/suspension settings, etc.) from a set of operating parameter sensors 132 and measured road conditions (altitude, road grade, surface type, surface friction level, etc.). It will be appreciated that these are merely examples of different parameters that could be utilized to optimize the powertrain 108 and the driveline 112 for operation during the rolling drag race and that other suitable parameters could also be monitored/sensed and taken into account by the controller 124. The driver interface 128 and the sets of sensors 132, 136 are also referred to collectively herein as "a set of devices" that are configured to collectively obtain (receive/measure) "rolling launch control information" for rolling drag race.

Figure 2:
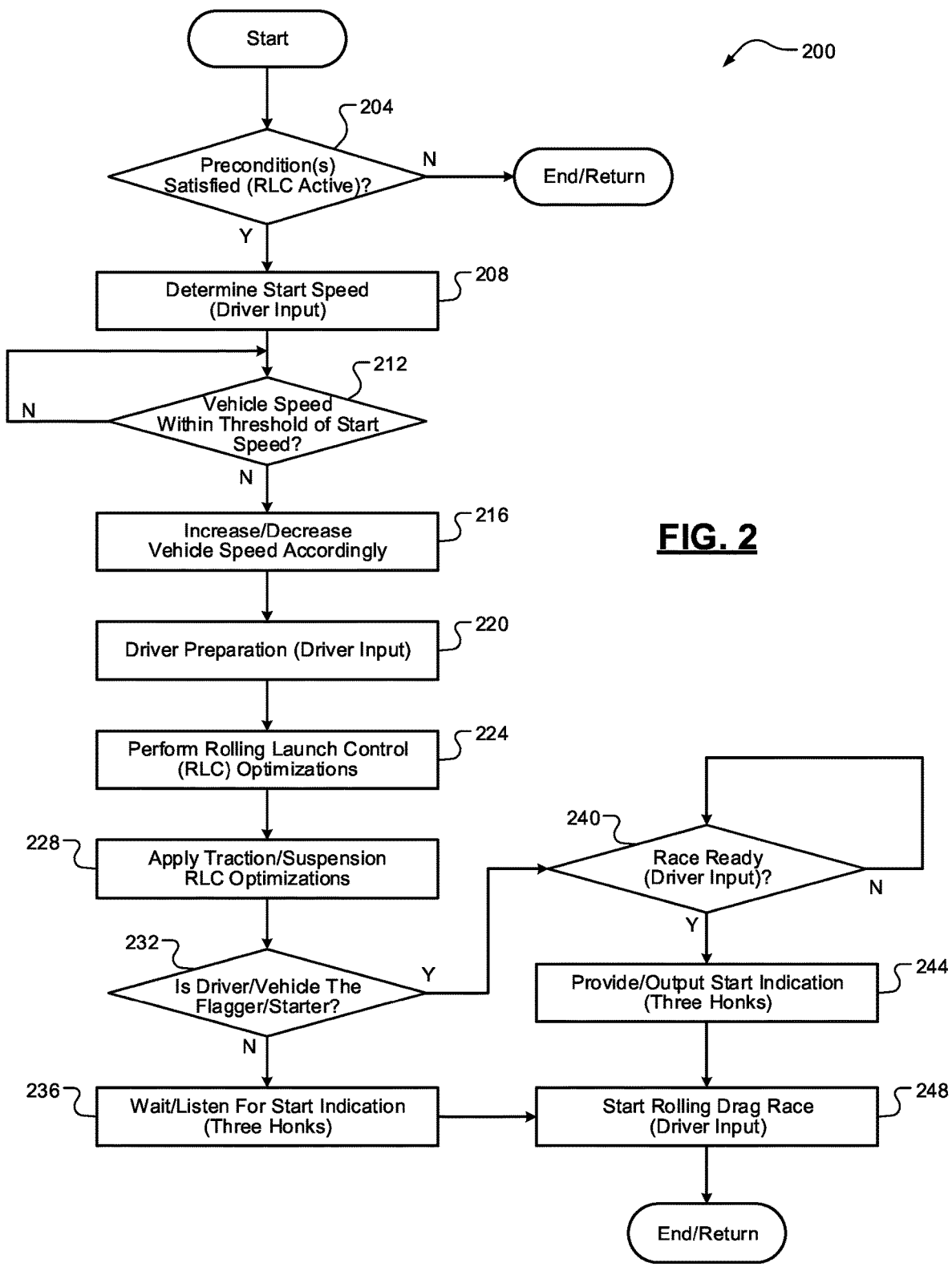
FIG. 2 is a flow diagram of an example rolling launch control method for improved rolling drag racing performance by a vehicle according to the principles of the present application.

Referring now to FIG. 2, a flow diagram of an example rolling launch control (RLC) method 200 for improved rolling drag racing performance by a vehicle according to some implementations of the present application is illustrated. While the vehicle 100 and its components are specifically referenced for illustrative/descriptive purposes, it will be appreciated that the method 200 could be applicable to any suitably configured vehicle. At 204, the controller 124 determines whether an optional set of one or more preconditions are satisfied. This set of optional precondition(s) could include, for example only, there being no malfunctions present that would inhibit operation of the vehicle 100 (e.g., the powertrain 108) or the operation of the rolling launch control (RLC) system 104. When false, the method 200 ends or returns to 204.

These precondition(s) could also include the RLC feature being active or engaged (e.g., in response to a driver input or selection). In some implementations, these precondition(s) could also include safety-related preconditions, such as information verifying that the vehicle 100 is at an organized/legal drag racing event or similar area. For example only, geo-fencing could be used to verify the vehicle's location at an allowed area (a drag strip, a track, or the like) for usage of the features of the present application. When true, the method 200 continues to 208.

At 208, the controller 124 determines a start speed for the vehicle 100 to maintain until the start of the rolling drag race. In some implementations, the start speed could be predetermined as it could be a widely-accepted value (e.g., 40 mph). This start speed could be, for example, input by the driver via the driver interface 128 (e.g., a selectable knob or a touch display). It will also be appreciated that at least some of the parameters relating to the rolling launch control (RLC) feature of the present application could be communicated between the vehicles, such as via vehicle-to-anything (V2X) communication. This could include short-range wireless communication, such as Bluetooth or WiFi Direct, or longer range wireless communication, such as a cellular network. By sharing information amongst the participating vehicles, the drivers do not need to communicate these parameters (e.g., vehicle start speed). The level or capability of such sharing could depend on the type of the vehicles participating in the rolling drag race. When all of the participating vehicles are made by the same original equipment manufacturer (OEM), a highest level of secured sharing and information usage could be available, which could be desirable to drivers (i.e., to purchase a vehicle from a particular OEM).

At 212, the controller 124 determines whether the speed of the vehicle 100 is within a threshold amount (e.g., less than 1 mph) from the start speed for the rolling drag race. When true, the method 200 continues to 220. When false, the method 200 proceeds to 216 where the controller 124 increases or decreases the vehicle speed accordingly and the method 200 returns to 212 until the vehicle speed is within the threshold amount from the start speed. At 220, driver preparation for the rolling drag race occurs. This includes specific driver input to prepare for the start of the rolling drag race. This could include, for example only, the driver holding down one of the paddle shifters (e.g., a left paddle shifter) and fully-depressing an accelerator pedal (e.g., to WOT). At 224, the controller 124 then performs rolling launch control (RLC) optimizations. This could include, for example only, automatically applying or configuring specific traction control settings (e.g., acceptable wheel slip) and specific driveline/suspension system settings based on the monitored vehicle/powertrain operating parameters and road conditions (via sensors 132 and 136). This could also include powertrain preconditioning, such as generating a torque reserve (engine spark retardation, air/exhaust flow management for a turbocharger/supercharger, air/exhaust gas cooling, battery or fuel cell management, etc.) which could then be depleted during the rolling drag race.

At 232, the controller 124 determines whether the driver is the flagger or starter for the rolling drag race. This could have been predetermined by the drivers prior to entering their vehicles or the driver could have "opted-in" to be the starter/flagger via some sort of vehicle input (e.g., via a touch display). When false, the method 200 continues to 236 where the driver waits (e.g., listens) for the rolling drag race start signal or indication (e.g., three horn honks). When true, however, the method 200 continues to 240 where the driver has provided input indicating that he/she is race ready. This input could include, for example only, holding the other paddle shifter (e.g., the right paddle shifter). Upon receiving the race-ready input, the method 200 proceeds to 244 where the start signal/indication is automatically generated or output by the vehicle 100. As previously mentioned, this could be three successive honks of the horn of the vehicle 100. The driver could then stop providing the race-ready input (e.g., release the right paddle shifter). At 248, the rolling drag race begins and the driver provides driver input to begin the rolling drag race. This could include, for example only, releasing the left paddle shifter and maintaining the fully-depressed accelerator pedal (e.g., WOT). The method 200 then ends or returns to 204 for another cycle.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A rolling launch control system for a vehicle, the rolling launch control system comprising:
   a set of devices configured to obtain rolling launch control information for a rolling drag race including the vehicle, the rolling launch control information including at least a start speed for the rolling drag race; and
   a controller configured to:
      control a powertrain of the vehicle such that the vehicle maintains the start speed until a start of the rolling drag race;
      receive a first driver input in preparation for the rolling drag race, the first driver input including at least a fully-depressed accelerator pedal;
      optimally adjust settings of at least one of the powertrain and a driveline of the vehicle based on the rolling launch control information; and
      in response to a start signal or indication for the rolling drag race, stop maintaining the vehicle start speed and launch the vehicle with the fully-depressed accelerator pedal and the optimized powertrain/driveline settings.

2. The rolling launch control system of claim 1, wherein the start speed for the rolling drag race is provided by the driver as a driver input or is communicated to the vehicle by another vehicle participating in the rolling drag race.

3. The rolling launch control system of claim 1, wherein the rolling launch control information includes at least one of a plurality of operating parameters of the powertrain and a plurality of conditions of a road along which the vehicle is traveling.

4. The rolling launch control system of claim 1, wherein the driveline settings include at least one of traction control settings and suspension settings.

5. The rolling launch control system of claim 1, wherein the first driver input further includes the driver holding one of two steering wheel paddle shifters of the vehicle.

6. The rolling launch control system of claim 5, wherein the controller is configured to launch the vehicle in response to a second driver input that includes the driver releasing the one of the two steering wheel paddle shifters.

7. The rolling launch control system of claim 6, wherein the controller is further configured to determine whether the vehicle is a starter/flagger vehicle for the rolling drag race.

8. The rolling launch control system of claim 7, wherein when the vehicle is the starter/flagger vehicle for the rolling drag race, the controller is further configured to automatically output the start signal or indication for the rolling drag race.

9. The rolling launch control system of claim 8, wherein the controller is configured to automatically output the start signal or indication for the rolling drag race in response to the driver providing a second driver input.

10. The rolling launch control system of claim 9, wherein the second driver input is holding the other of the two paddle shifters, and wherein the start signal or indication is three successive honks of a horn of the vehicle.

11. A rolling launch control method for a vehicle, the rolling launch control method comprising:
receiving, by a controller and from a set of devices, rolling launch control information for a rolling drag race including the vehicle, the rolling launch control information including at least a start speed for the rolling drag race;
controlling, by the controller, a powertrain of the vehicle such that the vehicle maintains the start speed until a start of the rolling drag race;
receiving, by the controller, a first driver input in preparation for the rolling drag race, the first driver input including at least a fully-depressed accelerator pedal;
optimally adjusting, by the controller, settings of at least one of the powertrain and a driveline of the vehicle based on the rolling launch control information; and
in response to a start signal or indication for the rolling drag race, stopping maintaining the vehicle start speed and launching, by the controller, the vehicle with the fully-depressed accelerator pedal and the optimized powertrain/driveline settings.

12. The rolling launch control method of claim 11, wherein the start speed for the rolling drag race is provided by the driver as a driver input or is communicated to the vehicle by another vehicle participating in the rolling drag race.

13. The rolling launch control method of claim 11, wherein the rolling launch control information includes at least one of a plurality of operating parameters of the powertrain and a plurality of conditions of a road along which the vehicle is traveling.

14. The rolling launch control method of claim 11, wherein the driveline settings include at least one of traction control settings and suspension settings.

15. The rolling launch control method of claim 11, wherein the first driver input further includes the driver holding one of two steering wheel paddle shifters of the vehicle.

16. The rolling launch control method of claim 15, wherein launching the vehicle is performed by the controller in response to a second driver input that includes the driver releasing the one of the two steering wheel paddle shifters.

17. The rolling launch control method of claim 16, further comprising determining, by the controller, whether the vehicle is a starter/flagger vehicle for the rolling drag race.

18. The rolling launch control method of claim 17, wherein when the vehicle is the starter/flagger vehicle for the rolling drag race, the method further comprises automatically outputting, by the controller, the start signal or indication for the rolling drag race.

19. The rolling launch control method of claim 18, wherein automatically outputting the start signal or indication for the rolling drag race is performed by the controller in response to the driver providing a second driver input.

20. The rolling launch control method of claim 19, wherein the second driver input is holding the other of the two paddle shifters, and wherein the start signal or indication is three successive honks of a horn of the vehicle.

* * * * *